United States Patent
Amma et al.

(10) Patent No.: US 10,295,736 B2
(45) Date of Patent: May 21, 2019

(54) MULTICORE FIBER

(71) Applicant: FUJIKURA LTD., Tokyo (JP)

(72) Inventors: Yoshimichi Amma, Chiba (JP);
Katsuhiro Takenaga, Chiba (JP);
Shota Saito, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/780,143

(22) PCT Filed: Oct. 25, 2016

(86) PCT No.: PCT/JP2016/081523
§ 371 (c)(1),
(2) Date: May 30, 2018

(87) PCT Pub. No.: WO2017/130487
PCT Pub. Date: Aug. 3, 2017

(65) Prior Publication Data
US 2018/0356590 A1    Dec. 13, 2018

(30) Foreign Application Priority Data
Jan. 29, 2016  (JP) .................................. 2016-016652

(51) Int. Cl.
*G02B 6/02*   (2006.01)
*G02B 6/036*  (2006.01)

(52) U.S. Cl.
CPC ............ *G02B 6/03611* (2013.01); *G02B 6/02* (2013.01); *G02B 6/02042* (2013.01); *G02B 6/036* (2013.01)

(58) Field of Classification Search
CPC .................................................. G02B 6/02042
See application file for complete search history.

(56) References Cited

U.S. PATENT DOCUMENTS

| | | | |
|---|---|---|---|
| 9,477,035 B2 * | 10/2016 | Uemura | G02B 6/03611 |
| 2014/0093205 A1 | 4/2014 | Gruner-Nielsen et al. | |
| 2015/0234120 A1 * | 8/2015 | Uemura | G02B 6/028 |
| | | | 385/124 |

FOREIGN PATENT DOCUMENTS

| | | | | |
|---|---|---|---|---|
| JP | 11095049 A | * | 4/1999 | ......... G02B 6/02042 |
| JP | 2014-509410 A | | 4/2014 | |
| JP | 2015-152774 A | | 8/2015 | |
| JP | 2016-016652 A | | 10/2017 | |

OTHER PUBLICATIONS

Andore et al., Machine Translation of JP 11-095049 A, Apr. 1999.*

(Continued)

*Primary Examiner* — Michelle R Connelly
(74) *Attorney, Agent, or Firm* — Osha Liang LLP

(57) ABSTRACT

A multicore fiber includes a plurality of cores including a first core and a cladding surrounding the plurality of cores. The first core includes: an inner core; and an outer core surrounding the inner core with no gap and having a refractive index higher than a refractive index of the inner core and a refractive index of the cladding. The core is not doped with any rare earth element. At least two LP mode light beams at a predetermined wavelength propagate through the first core at an attenuation of 0.3 dB/km or less.

7 Claims, 6 Drawing Sheets

(56) References Cited

OTHER PUBLICATIONS

Soma, D. et al.; "2.05 Peta-bit/s Super-Nyquist-WDM SDM Transmission Using 9.8-km 6-mode 19-core Fiber in Full C band"; ECOC 2015 Valencia (Spain) (3 pages).
Shibahara, K. et al.; "Dense SDM (12-core x 3-mode) Transmission over 527 km with 33.2-ns Mode-Dispersion Employing Low-Complexity Parallel MIMO Frequency-Domain Equalization"; OFC Postdeadline Papers OSA 2015 (3 pages).
Sillard, P.; "Next-Generation Fibers for Space-Division-Multiplexed Transmissions"; Journal of Lightwave Technology, vol. 33, No. 5, Mar. 1, 2015; pp. 1092-1099 (6 pages).
Jin, X.Q.; "Influence of Refractive Index Profile of Ring-Core Fibres for Space Division Multiplexing Systems"; IEEE Summer Topicals Meeting Series, 2014; pp. 178-179 (2 pages).
Office Action for corresponding Japanese Application No. 2016-016652 dated Oct. 3, 2017 (4 pages).
Decision to Grant a Patent for corresponding Japanese Application No. 2016-016652 dated Apr. 24, 2018 (5 pages).

\* cited by examiner

MULTICORE FIBER

TECHNICAL FIELD

The present invention relates to a multicore optical fiber.

BACKGROUND

Optical fibers for use in optical fiber communication systems generally widely available have a structure in which the outer circumferential surface of a core is surrounded by a cladding and optical signals propagate through the inside of this core to transmit information. Nowadays, with the widespread use of optical fiber communication systems, information volumes to be transmitted are tremendously increasing.

In order to achieve such an increase in the transmission capacity of optical fiber communication systems, the transmission of a plurality of signals using a multicore fiber is known. The multicore fiber has a plurality of cores. The outer circumferential surfaces of the plurality of cores are surrounded by one cladding. The plurality of signals is transmitted with light beams propagating through the cores. In order to achieve a further increase in the transmission capacity, transmission using a few-mode multicore fiber (FM-MCF) for multimode communication is also known. In the cores of the multicore fiber, information is superposed on an $LP_{01}$ mode light beam that is in the fundamental mode, and information is also superposed on light beams in higher modes than the fundamental mode for information communication. Such a few-mode multicore fiber is disclosed in Non Patent Literature 1 below, for example.

Multicore fibers may have crosstalk between cores. The crosstalk is optical transition from cores to the adjacent cores. In the few-mode multicore fiber, this crosstalk is more prone to be noticeable. For example, a so-called step index core having a refractive index approximately constant in the radial direction is widely used in optical fibers. In the step index core, higher mode light beams like an $LP_{11}$ mode light beam are easily spread to the outer side of the core than the $LP_{01}$ mode light beam is. Thus, the higher mode light beam has an effective area larger than the effective area of the $LP_{01}$ mode light beam, easily causing the crosstalk between higher mode light beams propagating through the cores adjacent to each other.

A decrease in the effective area of the higher mode light beam can be considered. However, a decrease in the effective area of the higher mode light beam considerably shrinks the effective area of the $LP_{01}$ mode light beam, resulting in concern with the degradation of signal quality due to nonlinear effects and an increase in connection loss. Thus, in the design of the few-mode multicore fiber, the crosstalk between higher mode light beams is reduced with no decrease in the effective area of the $LP_{01}$ mode light beam. An example that satisfies these conditions is a heterogeneous core few-mode multicore fiber disclosed in Non Patent Literature 2 below, for example.

[Non Patent Literature 1] D. Soma et al., "2.05 Peta-bit/s Super-Nyquist-WDM SDM Transmission Using 9.8-km 6-mode 19-core Fiber in C band," Proc. ECOC2015, PDP3.2, 2015.

[Non Patent Literature 2] K. Shibahara et al., "Dense SDM (12-corex3-mode) Transmission over 527 km with 33.2-ns Mode-Dispersion Employing Low-Complexity Parallel MIMO Frequency-Domain Equalization," Proc. OFC2015, Th5C.3, 2015.

The heterogeneous core few-mode multicore fiber disclosed in Non Patent Literature 2 above has manufacturing imperfections in which a plurality of types of cores has to be prepared accurately as the cores are designed. The multicore fiber also has imperfections in which optical properties are varied depending on core types. Therefore, a reduction in crosstalk is desired by a method different from a method for the heterogeneous core multicore fiber.

SUMMARY

Therefore, one or more embodiments of the present invention provide a multicore fiber that reduces crosstalk and are suitable for propagating light beams in a plurality of modes through cores.

A multicore fiber according to one or more embodiments of the present invention includes: a plurality of cores; and a cladding surrounding the plurality of cores, wherein the core has an inner core and an outer core surrounding the inner core with no gap, the outer core having a refractive index higher than a refractive index of the inner core and a refractive index of the cladding, the core is doped with no rare earth element, and at least two LP mode light beams at a predetermined wavelength propagate through the core at an attenuation of 0.3 dB/km or less.

The core has the inner core and the outer core surrounding the inner core and having a refractive index higher than the refractive index of the inner core. Thus, compared with the step index core in which the refractive index of the core is approximately constant in the radial direction, the electric field distribution of the $LP_{01}$ mode light beam tends to be spread and the electric field distribution of the higher mode light beam tends to be narrow. Consequently, in the multicore fiber, the effective area of the $LP_{01}$ mode light beam and the effective area of the higher mode light beam easily have close values. As a result, the effective area of the higher mode light beam can be made small while the effective area of the $LP_{01}$ mode light beam is prevented from being too small. Accordingly, the crosstalk between higher mode light beams can be reduced while the degradation of signal quality due to nonlinear effects and an increase in connection loss are reduced.

In the case in which the cutoff wavelength and the effective area of the $LP_{01}$ mode light beam are the same in the core of the multicore fiber and the step index core, the effective refractive indexes of the light beams propagating through the core of the multicore fiber tend to be greater than the effective refractive indexes of the light beams propagating through the step index core. Therefore, also from this viewpoint, the multicore fiber can reduce crosstalk.

The core is doped with no rare earth element, and at least two LP mode light beams at a predetermined wavelength propagate through the core at a transmission loss of 0.3 dB/km or less. Consequently, the multicore fiber is suitable for long distance communication with a large transmission capacity.

In the multicore fiber according to one or more embodiments, a ratio $r_1/r_2$ is 0.6 or less where $r_1$ is defined as a radius of the inner core, and $r_2$ is defined as a radius of the outer core. In the multicore fiber according to other embodiments, the ratio $r_1/r_2$ is 0.3 or more and 0.5 or less.

As described later, the present inventors found that crosstalk is further reduced in the case in which $r_1/r_2$ is 0.6 or less, and crosstalk is more easily reduced in the case in which $r_1/r_2$ is 0.3 or more and 0.5 or less. Therefore, in the multicore fiber in a configuration according to one or more embodiments, more suitable information communication can be performed.

Furthermore, the core according to one or more embodiments is surrounded by a low refractive index part having a refractive index lower than the refractive index of the cladding.

The core is surrounded by the low refractive index part. Consequently, the spread of the electric fields of light beams propagating through the core can be reduced, resulting in further facilitating a reduction in crosstalk.

Furthermore, according to one or more embodiments, a relative refractive index difference of the outer core to the cladding is 3% or less.

The component materials of the outer core and the cladding are selected in such a manner that the relative refractive index difference of the outer core to the cladding is small. Consequently, in the manufacturing process of the multicore fiber according to one or more embodiments, the occurrence of internal stress in a preform is reduced, and damage to the preform is reduced.

Two or three LP mode light beams at a predetermined wavelength can be caused to propagate through the core of the multicore fiber in one or more embodiments.

The present inventors found that when the core has the inner core and the outer core surrounding the inner core and having a refractive index higher than the refractive index of the inner core, the effective area of the $LP_{01}$ mode light beam and the effective areas of the $LP_{11}$ mode and the $LP_{21}$ mode light beams tend to have close values, compared with the step index core. Therefore, in accordance with one or more embodiments of the multicore fiber, the effective areas of the $LP_{11}$ mode and the $LP_{21}$ mode light beams can be made small while the effective area of the $LP_{01}$ mode light beam is prevented from being too small. Accordingly, the crosstalk between the $LP_{11}$ mode and the $LP_{21}$ mode light beams can be reduced while the degradation of signal quality due to nonlinear effects and an increase in connection loss are reduced.

As described above, in accordance with one or more embodiments of the present invention, a multicore fiber that reduces crosstalk is provided.

DETAILED DESCRIPTION

In the following, one or more embodiments of a multicore fiber according to the present invention will be described in detail with reference to the drawings.

Figure 1A:
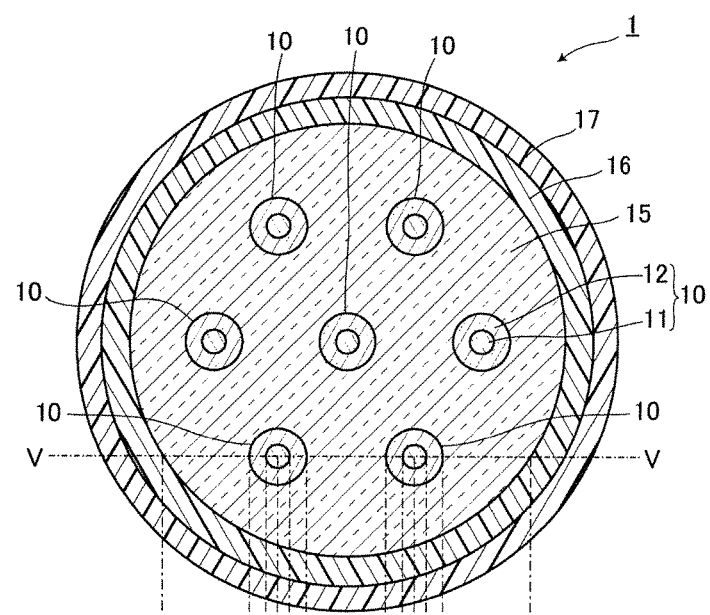
FIG. 1A is a view of a cross section perpendicular to the longitudinal direction of a multicore fiber according to one or more embodiments of the present invention.
Figure 1B:
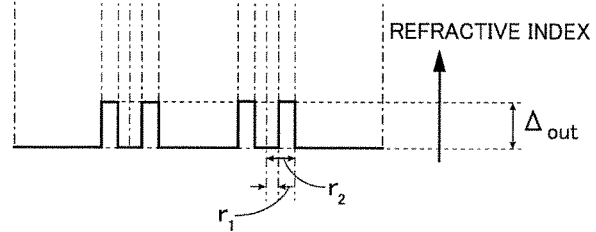
FIG. 1B is a diagram showing a refractive index distribution on the line V-V in the cross section shown in FIG. 1A according to one or more embodiments.

FIG. 1A is a view of a cross section perpendicular to the longitudinal direction of a multicore fiber according to one or more embodiments of the present invention. Specifically, FIG. 1A illustrates the structure of a multicore fiber 1 in the cross section. FIG. 1B illustrates a refractive index profile along line V-V in the cross section in accordance with one or more embodiments.

As illustrated in FIG. 1A, the multicore fiber 1 according to one or more embodiments includes a plurality of cores 10, a cladding 15 surrounding the plurality of cores 10 with no gap, an inner protective layer 16 covering the outer circumferential surface of the cladding 15, and an outer protective layer 17 covering the outer circumferential surface of the inner protective layer 16 as main components. Note that, the number of the cores 10 and the arrangement of the cores 10 are not limited specifically. However, in one or more embodiments, the number of the cores 10 is seven.

As described above, the number of the cores 10 according to one or more embodiments is seven. One core 10 is placed in the center of the multicore fiber 1. The other six cores 10 are placed around the core 10 placed in the center. In this state, lines connecting the centers of the cores 10 form a triangular lattice, and the inter-center pitch between the cores 10 adjacent to each other is made equal.

The core 10 has an inner core 11 and an outer core 12 surrounding the inner core 11 with no gap. In the description below, the radius of the inner core 11 is defined as $r_1$, and the radius of the outer core is defined as $r_2$. In accordance with one or more embodiments, the ratio $r_1/r_2$ between $r_1$ and $r_2$ is 0.6 or less. In accordance with other embodiments, the ratio $r_1/r_2$ between $r_1$ and $r_2$ is 0.3 or more and 0.5 or less.

As illustrated in FIG. 1B, the refractive index of the outer core 12 is higher than the refractive index of the inner core 11 and the refractive index of the cladding 15 in accordance with one or more embodiments. In one or more embodiments, the refractive index of the inner core 11 is equivalent to the refractive index of the cladding 15. In the description below, the relative refractive index difference of the outer core 12 to the cladding 15 is defined as $\Delta_{out}$. In accordance with one or more embodiments, the relative refractive index difference $\Delta_{out}$ of the outer core 12 to the cladding 15 is 3% or less. The component materials of the outer core 12 and the cladding 15 are selected in such a manner that the relative refractive index difference $\Delta_{out}$ of the outer core 12 to the cladding 15 is decreased. Thus, in the manufacturing process of the multicore fiber 1, the occurrence of internal stress in a preform is reduced, and damage to the preform is reduced.

In the core 10 as described above, the outer core 12 is formed of silica doped with a dopant, germanium, for example, that increases the refractive index. The inner core 11 and the cladding 15 are formed of pure silica, for example.

The core 10 is doped with no rare earth element. At least two LP mode light beams at a predetermined wavelength propagate through the core 10 at an attenuation of 0.3 dB/km or less. Consequently, the multicore fiber 1 is suitable for long distance communication with a large transmission capacity.

The inner protective layer 16 and the outer protective layer 17 are formed of resins, such as ultraviolet curing resins. The inner protective layer 16 and the outer protective layer 17 are formed of resins different from each other.

Figure 2:
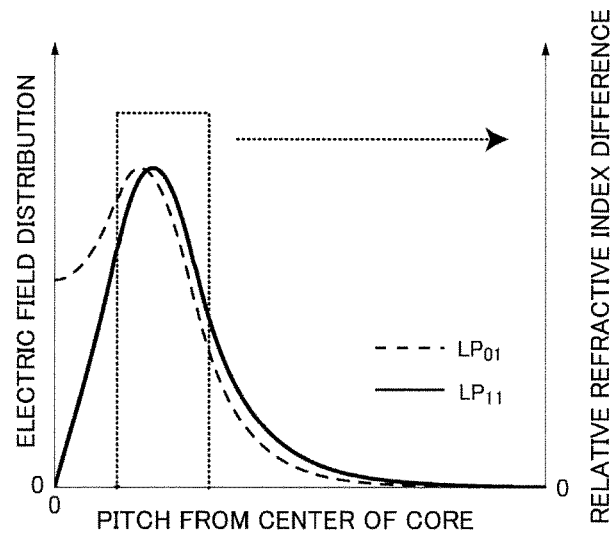
FIG. 2 is a diagram schematically illustrating the relationship between the pitch from the center of a core illustrated in FIG. 1A and the relative refractive index difference of the core to a neighboring cladding and the electric field distributions of light beams propagating through the core according to one or more embodiments.

Next, the electric field distributions of the light beams propagating through the core 10 will be described. FIG. 2 is a diagram schematically illustrating the relationship between the pitch from the center of one core 10 of the cores 10 included in the multicore fiber 1 and the relative refractive index difference of the core 10 to the neighboring cladding 15, and the electric field distributions of light beams propagating through the core 10 in accordance with one or more embodiments. In FIG. 2, a dotted line indicates the relative refractive index difference to the cladding 15, a broken line indicates the electric field distribution of an $LP_{01}$ mode light beam, and a solid line indicates the electric field distribution of an $LP_{11}$ mode light beam.

As apparent from FIG. 2, in the core 10, the electric field distribution of the $LP_{01}$ mode light beam comes close to the electric field distribution of the $LP_{11}$ mode light beam that is in a higher mode. The following is a main factor that is considered to be this closeness. Since the core 10 includes the inner core 11 having a low refractive index and the outer core 12 surrounding the inner core 11 and having a high refractive index, the electric field distribution of the $LP_{01}$ mode light beam is easily spread near the center of the core 10. As described above, the electric field distribution of the $LP_{01}$ mode light beam is close to the electric field distribution of the $LP_{11}$ mode light beam that is in a higher mode. Consequently, in the core 10, the effective area of the $LP_{01}$ mode light beam and the effective area of the $LP_{11}$ mode light beam have close values. In the following, the comparison of the core 10 with the step index core will be described.

Figure 3:
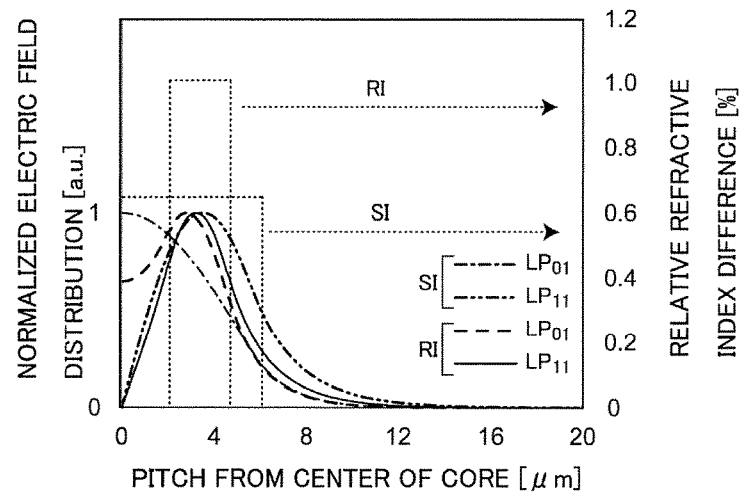
FIG. 3 is a diagram of the relative refractive index difference between the core in FIG. 1A and a step index core and the electric field distributions of light beams propagating through the cores in the case in which the cutoff wavelength of an $LP_{21}$ mode light beam and the effective area of an $LP_{01}$ mode light beam are fixed according to one or more embodiments.
Figure 4:
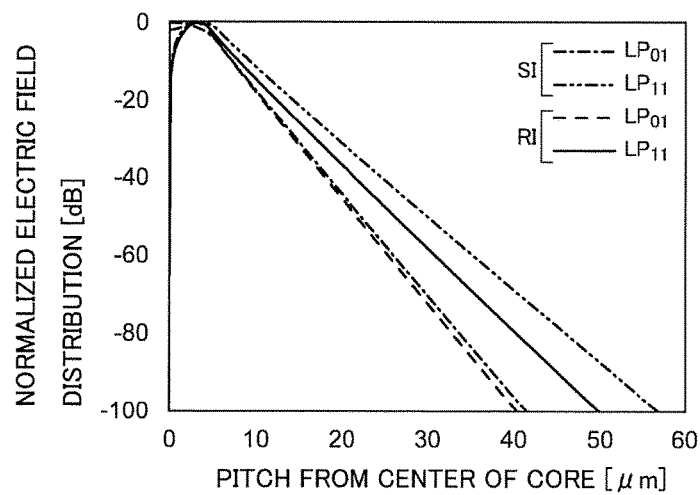
FIG. 4 is a diagram of the electric field distributions of light beams propagating through the core in FIG. 1A and the step index core in the scale different from the scale in FIG. 3 according to one or more embodiments.

FIG. 3 is a diagram of the relative refractive index difference of the core 10 to the cladding and the relative refractive index difference of the step index core to the cladding and the electric field distributions of the light beams propagating through the cores in the case in which the cutoff wavelength of an $LP_{21}$ mode light beam and the effective area of the $LP_{01}$ mode light beam are fixed in accordance with one or more embodiments. FIG. 4 is a diagram of the electric field distributions of light beams propagating through the core 10 and the step index core in the scale different from the scale in FIG. 3 in accordance with one or more embodiments. Here, the theoretical cutoff wavelength of the $LP_{21}$ mode light beam is set to 1.5 μm, and the effective area of the $LP_{01}$ mode light beam is 80 μm$^2$ at a wavelength of 1,550 nm. Note that, in FIG. 3 and drawings after FIG. 3 and the following description, a core having a ring-shaped high refractive index portion like the core 10 is sometimes written in "RI", and the step index core is sometimes written in "SI".

As apparent from FIG. 3, near the center of the core, the electric field distribution of the $LP_{11}$ mode light beam comes close to the electric field distribution of the $LP_{01}$ mode light beam in the core 10 than in the step index core. As apparent from FIG. 4, the spread of the electric field distributions of the light beams propagating through the core is smaller in the core 10 than in the step index core. As a result, crosstalk is reduced between the cores 10 adjacent to each other.

Figure 5:
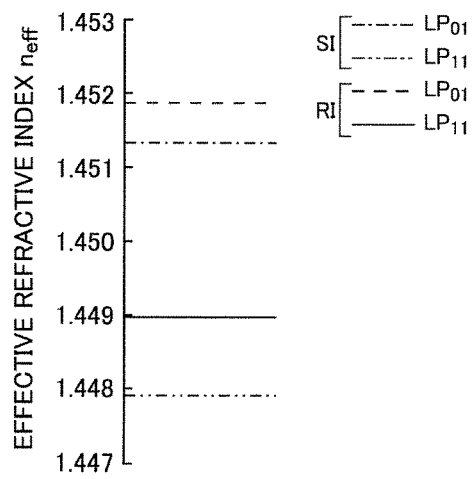
FIG. 5 is a diagram of the effective refractive indexes of light beams propagating through the core in FIG. 1A and light beams propagating through the step index core according to one or more one or more embodiments.

In accordance with one or more embodiments, FIG. 5 is a diagram of the effective refractive indexes of light beams propagating through the core 10 and the effective refractive indexes of light beams propagating through the step index core in the case in which the effective area of the $LP_{01}$ mode light beam at a wavelength of 1,550 nm is 80 μm$^2$ and the theoretical cutoff wavelength of the $LP_{21}$ mode light beam is 1.5 μm.

As apparent from FIG. 5, in the case in which the theoretical cutoff wavelength of the $LP_{21}$ mode light beam and the effective area of the $LP_{01}$ mode light beam are the same in the core 10 and the step index core, the effective refractive indexes of the light beams propagating through the core 10 are greater than the effective refractive indexes of the light beams propagating through the step index core. Crosstalk tends to be decreased when the effective refractive index is great. Thus, also from the fact that the effective refractive indexes of the light beams propagating through the core 10 become large as described above, it is revealed that crosstalk is reduced in the multicore fiber 1.

As described above, in the multicore fiber 1 according to one or more embodiments, the core 10 includes the inner core 11 and the outer core 12 surrounding the inner core 11 and having a refractive index higher than the refractive index of the inner core 11. Consequently, the electric field distribution of the $LP_{01}$ mode light beam is spread and the electric field distribution of the higher mode light beam is narrow, compared with the step index core in which the refractive index of the core is approximately constant in the radial direction. Thus, the effective area of the $LP_{01}$ mode light beam and the effective area of the higher mode light beam have close values. As a result, the effective area of the higher mode light beam can be made small while the effective area of the $LP_{01}$ mode light beam is prevented from being too small. Thus, the crosstalk between higher mode light beams can be reduced while the degradation of signal quality due to nonlinear effects and an increase in connection loss are reduced. In the case in which the cutoff wavelength and the effective area of the $LP_{01}$ mode light beam are the same in the core 10 of the multicore fiber 1 and the step index core, the effective refractive indexes of the light beams propagating through the core 10 of the multicore fiber 1 tend to be greater than the effective refractive indexes of the light beams propagating through the step index core. Therefore, also from this viewpoint, the multicore fiber 1 can reduce crosstalk.

Next, one or more additional embodiments of the present invention will be described. Note that, components the same as or equivalent to the components of the previously described embodiments are designated the same reference signs, and the duplicate description is omitted unless otherwise specified.

Figure 6A:
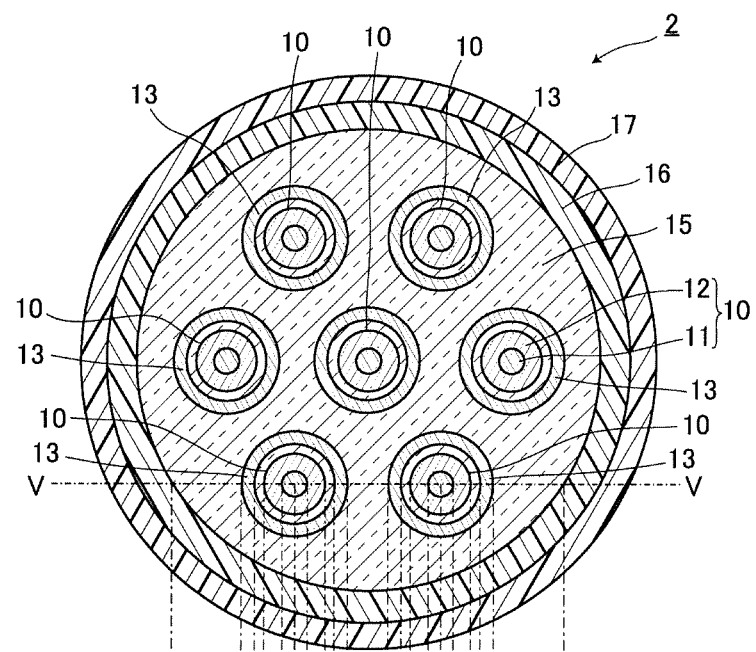
FIG. 6A is a view of a cross section perpendicular to the longitudinal direction of a multicore fiber according to one or more embodiments of the present invention.
Figure 6B:
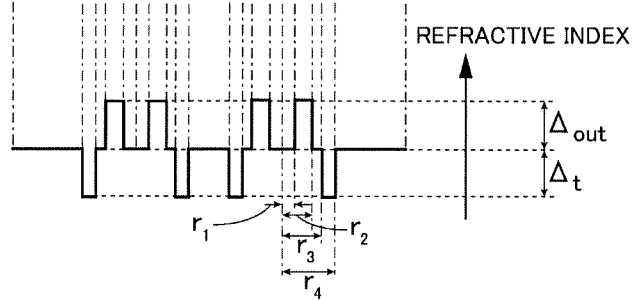
FIG. 6B is a diagram showing a refractive index distribution on the line V-V in the cross section shown in FIG. 6A according to one or more embodiments.

FIG. 6A is a view of a cross section perpendicular to the longitudinal direction of a multicore fiber according to one or more embodiments of the present invention. Specifically, FIG. 6A illustrates the structure of a multicore fiber 2 in the cross section. FIG. 6B illustrates a refractive index profile along line V-V in the cross section according to one or more embodiments.

As illustrated in FIG. 6A, the multicore fiber 2 according to one or more embodiments is different from the multicore fiber 1 according to the previously described embodiments in that a core 10 is surrounded by a low refractive index part 13 having a refractive index lower than the refractive index of a cladding 15. In FIG. 6B, $r_3$ is the inner diameter of the low refractive index part 13, $r_4$ is the outer diameter of the low refractive index part 13, and $\Delta_r$ is the relative refractive index difference of the low refractive index part 13 to the cladding 15 in accordance with one or more embodiments. The low refractive index part 13 is configured of silica doped with a dopant, fluorine, for example, that decreases the refractive index.

Also, in the multicore fiber 2 according to one or more embodiments, crosstalk is reduced similarly to the multicore fiber 1. In the multicore fiber 2, the core 10 is surrounded by the low refractive index part 13. Consequently, the spread of the effective areas of the light beams propagating through the core 10 can be reduced, resulting in facilitating a reduction in crosstalk.

As described above, one or more embodiments of the present invention are described using the foregoing embodiments as non-limiting examples. However, the present invention is not limited to these embodiments. For example, in the previously described embodiments, the ratio $r_1/r_2$ between the radius $r_1$ of the inner core 11 and the radius $r_2$ of the outer core 12 is not limited to 0.6 or less. The relative refractive index difference of the outer core 12 to the cladding 15 is not limited to 3% or less.

In the forgoing embodiments, the description is made using an example in which the $LP_{01}$ mode light beam and the $LP_{11}$ mode light beam propagate through the core 10. However, at least two LP mode light beams at a predetermined wavelength are caused to propagate through the core 10. That is, two LP mode light beams, the $LP_{01}$ mode and the $LP_{11}$ mode light beams, that can be caused to propagate through the core 10 are not limited. Three LP mode light beams can also be caused to propagate through the core 10. For example, the $LP_{21}$ mode light beam can be caused to propagate through the core 10. The present inventors found that the difference between the effective area of the $LP_{01}$ mode light beam and the effective areas of the $LP_{11}$ mode and the $LP_{21}$ mode light beams propagating through the core 10 tends to be smaller than the difference between the effective areas of these light beams propagating through the step index core. Therefore, in the multicore fiber according to one or more embodiments of the present invention, the effective areas of the $LP_{11}$ mode and the $LP_{21}$ mode light beams can be made small while the effective area of the $LP_{01}$ mode light beam is prevented from being too small. Accordingly, the crosstalk between the $LP_{11}$ mode and the $LP_{21}$ mode light beams can be reduced between the cores adjacent to each other while the degradation of signal quality due to nonlinear effects and an increase in connection loss are reduced.

In the following, one or more embodiments of the present invention will be described more in detail using examples and comparative examples. However, the present invention is not limited to the examples below. Note that, the examples and comparative examples below are based on computer simulation using a multilayer division method.

Simulation was performed using the multicore fiber 1, according to one or more embodiments, as a model (RI). The parameters are shown in Table 1 below. In Table 1, $\Delta_{out}$ is the relative refractive index difference of the outer core 12 to the cladding 15, $r_1$ is the radius of the inner core 11, $r_2$ is the radius of the outer core 12, $A_{eff}(LP_{01})$ is the effective area of the $LP_{01}$ mode light beam at a wavelength of 1,550 nm, $A_{eff}(LP_{11})$ is the effective area of the $LP_{11}$ mode light beam at a wavelength of 1,550 nm, $\lambda_{ct}(LP_{21})$ is the theoretical cutoff wavelength of the $LP_{21}$ mode light beam that is in the second higher mode, $n_{eff}(LP_{11})$ is the effective refractive index of the $LP_{11}$ mode light beam, $\Lambda$ is a core pitch, and 100-km XT is the magnitude of crosstalk per 100 km between $LP_{11}$ mode light beams propagating through the cores adjacent to each other.

Except that the core is a step index core, simulation of Comparative Example 1 was performed on a model (SI) similar to Example 1. The parameters are shown in Table 1 below. Note that, since the multicore fiber of Comparative Example 1 has a step index core, $r_1=0$. The core is considered to be formed only of the elements corresponding to the outer core 12 of Example 1. Therefore, in Comparative Example 1, $\Delta_{out}$ means the relative refractive index difference of the core to the cladding.

TABLE 1

|  | Item | | | | | | | | |
|---|---|---|---|---|---|---|---|---|---|
|  | $\Delta_{out}$ | $r_1$ | $r_2$ | $r_1/r_2$ | $A_{eff}(LP_{01})$ | $A_{eff}(LP_{11})$ | $\lambda_{ct}(LP_{21})$ | $n_{eff}(LP_{11})$ | $\Lambda$ | 100-km XT |
|  | Unit | | | | | | | | | |
|  | % | μm | μm | — | μm² | μm² | μm | — | μm | dB |
| RI | 0.950 | 0.69 | 4.57 | 0.15 | 60 | 86 | 1.5 | 1.4495 | 45 | −74.5 |
|  | 0.721 | 0.79 | 5.29 | 0.15 | 80 | 114 | 1.5 | 1.4483 | 45 | −51.6 |
|  | 0.582 | 0.89 | 5.91 | 0.15 | 100 | 141 | 1.5 | 1.4475 | 45 | −35.7 |
|  | 0.486 | 0.97 | 6.48 | 0.15 | 120 | 170 | 1.5 | 1.4470 | 45 | −23.6 |
|  | 1.060 | 1.08 | 4.33 | 0.25 | 60 | 77 | 1.5 | 1.4500 | 45 | −82.9 |
|  | 0.804 | 1.25 | 5.00 | 0.25 | 80 | 103 | 1.5 | 1.4486 | 45 | −58.5 |
|  | 0.647 | 1.40 | 5.59 | 0.25 | 100 | 128 | 1.5 | 1.4478 | 45 | −41.6 |
|  | 0.541 | 1.53 | 6.13 | 0.25 | 120 | 153 | 1.5 | 1.4472 | 45 | −29.0 |
|  | 1.180 | 1.44 | 4.12 | 0.35 | 60 | 71 | 1.5 | 1.4503 | 45 | −88.2 |
|  | 0.899 | 1.67 | 4.76 | 0.35 | 80 | 94 | 1.5 | 1.4489 | 45 | −63.8 |
|  | 0.718 | 1.86 | 5.32 | 0.35 | 100 | 118 | 1.5 | 1.4480 | 45 | −45.2 |
|  | 0.601 | 2.04 | 5.83 | 0.35 | 120 | 141 | 1.5 | 1.4474 | 45 | −32.5 |
|  | 1.330 | 1.78 | 3.95 | 0.45 | 60 | 67 | 1.5 | 1.4505 | 45 | −91.7 |
|  | 1.001 | 2.05 | 4.56 | 0.45 | 80 | 90 | 1.5 | 1.4489 | 45 | −64.7 |
|  | 0.800 | 2.29 | 5.09 | 0.45 | 100 | 112 | 1.5 | 1.4480 | 45 | −46.0 |
|  | 0.671 | 2.51 | 5.58 | 0.45 | 120 | 134 | 1.5 | 1.4474 | 45 | −33.5 |

TABLE 1-continued

| | $\Delta_{out}$ | $r_1$ | $r_2$ | $r_1/r_2$ | $A_{eff}$ ($LP_{01}$) | $A_{eff}$ ($LP_{11}$) | $\lambda_{ct}$ ($LP_{21}$) | $n_{eff}$ ($LP_{11}$) | $\Lambda$ | 100-km XT |
|---|---|---|---|---|---|---|---|---|---|---|
| Unit | % | μm | μm | — | μm² | μm² | μm | — | μm | dB |
| | 1.520 | 2.09 | 3.80 | 0.55 | 60 | 66 | 1.5 | 1.4504 | 45 | −90.7 |
| | 1.144 | 2.41 | 4.38 | 0.55 | 80 | 87 | 1.5 | 1.4488 | 45 | −63.6 |
| | 0.916 | 2.69 | 4.89 | 0.55 | 100 | 109 | 1.5 | 1.4479 | 45 | −45.1 |
| | 0.768 | 2.95 | 5.36 | 0.55 | 120 | 130 | 1.5 | 1.4473 | 45 | −32.8 |
| | 2.376 | 2.64 | 3.52 | 0.75 | 60 | 65 | 1.5 | 1.4499 | 45 | −83.7 |
| | 1.810 | 3.05 | 4.06 | 0.75 | 80 | 85 | 1.5 | 1.4486 | 45 | −59.6 |
| | 1.449 | 3.40 | 4.53 | 0.75 | 100 | 106 | 1.5 | 1.4477 | 45 | −41.3 |
| | 1.209 | 3.72 | 4.96 | 0.75 | 120 | 127 | 1.5 | 1.4471 | 45 | −28.5 |
| SI | 0.855 | 0 | 4.83 | 0 | 60 | 95 | 1.5 | 1.4490 | 45 | −65.6 |
| | 0.648 | 0 | 5.58 | 0 | 80 | 126 | 1.5 | 1.4479 | 45 | −43.5 |
| | 0.520 | 0 | 6.24 | 0 | 100 | 158 | 1.5 | 1.4472 | 45 | −27.9 |
| | 0.433 | 0 | 6.83 | 0 | 120 | 189 | 1.5 | 1.4467 | 45 | −16.2 |

Figure 7:
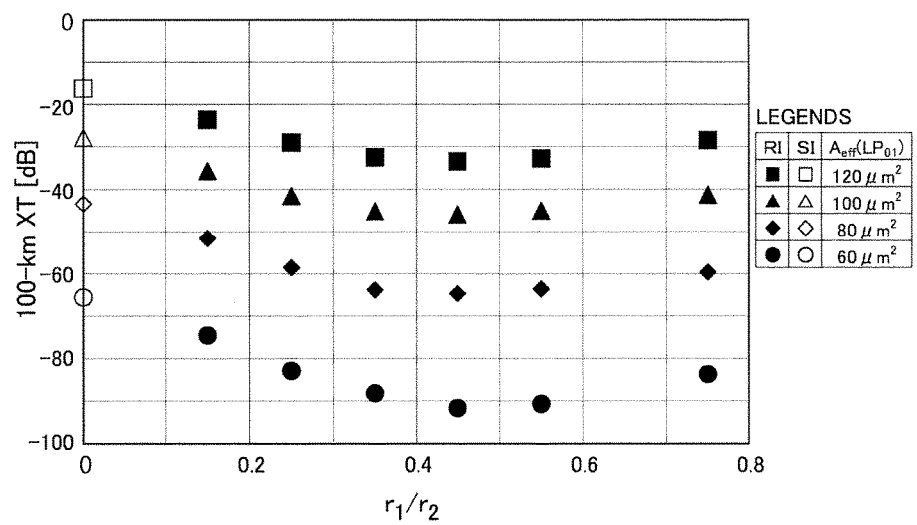
FIG. 7 is a diagram of the evaluation results of Example 1 according to one or more embodiments and Comparative Example 1.

The evaluation results of Example 1 according to one or more embodiments and Comparative Example 1 are shown in FIG. 7. In FIG. 7, the horizontal axis is defined as $r_1/r_2$, and the vertical axis is defined as 100-km XT.

As apparent from Table 1, the difference between the effective area $A_{eff}$ ($LP_{01}$) of the $LP_{01}$ mode light beam and the effective area $A_{eff}$ ($LP_{11}$) of the $LP_{11}$ mode light beam is smaller in Example 1 than in Comparative Example 1. As apparent from FIG. 7, in the case in which the effective area $A_{eff}$ ($LP_{01}$) of the $LP_{01}$ mode light beam is the same, the crosstalk between the $LP_{11}$ mode light beams propagating through the cores adjacent to each other is smaller in Example 1 than in Comparative Example 1. Specifically, in the range of $0 < r_1/r_2 \leq 0.6$, the crosstalk is smaller in Example 1 than in Comparative Example 1, and in the range of $0.3 < r_1/r_2 \leq 0.5$, crosstalk is much smaller in Example 1.

Simulation was performed using the multicore fiber 2, according to one or more embodiments, as a model (TA-RI). The parameters are shown in Table 2 below. In Table 2, $\Delta_{out}$, $r_1$, $r_2$, $A_{eff}$ ($LP_{01}$), $A_{eff}$ ($LP_{11}$), $n_{eff}$ ($LP_{11}$), $\Lambda$, and 100-km XT are similar to those in Table 1, $r_3$ is the inner diameter of the low refractive index part 13, $r_4$ is the outer diameter of the low refractive index part 13, and $\lambda_{cc}$ ($LP_{21}$) is the cable cutoff wavelength of the $LP_{21}$ mode light beam. Here, the relative refractive index difference $\Delta_t$ of the low refractive index part 13 to the cladding 15 was −0.7%, $(r_4 − r_3)/r_2 = 1.0$, and $r_3/r_2 = 1.7$.

Except that the core is a step index core, simulation of Comparative Example 2 was performed using a model (TA-SI) similar to Example 2. The parameters are shown in Table 2 below. Note that, since the multicore fiber of Comparative Example 2 has a step index core, $r_1 = 0$. The core is considered to be formed only of the elements corresponding to the outer core 12 of Example 2. Therefore, in Comparative Example 2, $\Delta_{out}$ means the relative refractive index difference of the core to the cladding.

TABLE 2

| | $\Delta_{out}$ | $r_1$ | $r_2$ | $r_3$ | $r_4$ | $r_1/r_2$ | $A_{eff}$ ($LP_{01}$) | $A_{eff}$ ($LP_{11}$) | $\lambda_{cc}$ ($LP_{21}$) | $n_{eff}$ ($LP_{11}$) | $\Lambda$ | 100-km XT |
|---|---|---|---|---|---|---|---|---|---|---|---|---|
| Unit | % | μm | μm | μm | μm | — | μm² | μm² | μm | — | μm | dB |
| TA-RI | 0.824 | 0.67 | 4.49 | 7.63 | 12.12 | 0.15 | 60 | 88 | 1.35 | 1.4478 | 45 | −77.9 |
| | 0.614 | 0.78 | 5.17 | 8.79 | 13.96 | 0.15 | 80 | 116 | 1.35 | 1.4468 | 45 | −64.3 |
| | 0.469 | 0.86 | 5.74 | 9.76 | 15.50 | 0.15 | 100 | 147 | 1.35 | 1.4460 | 45 | −52.7 |
| | 0.369 | 0.93 | 6.23 | 10.59 | 16.82 | 0.15 | 120 | 178 | 1.35 | 1.4454 | 45 | −44.7 |
| | 0.924 | 1.07 | 4.26 | 7.24 | 11.50 | 0.25 | 60 | 79 | 1.35 | 1.4481 | 45 | −83.2 |
| | 0.690 | 1.23 | 4.92 | 8.36 | 13.28 | 0.25 | 80 | 105 | 1.35 | 1.4471 | 45 | −68.6 |
| | 0.538 | 1.37 | 5.48 | 9.32 | 14.80 | 0.25 | 100 | 132 | 1.35 | 1.4463 | 45 | −57.8 |
| | 0.424 | 1.49 | 5.96 | 10.13 | 16.09 | 0.25 | 120 | 160 | 1.35 | 1.4457 | 45 | −48.3 |
| | 1.027 | 1.42 | 4.05 | 6.89 | 10.94 | 0.35 | 60 | 73 | 1.35 | 1.4483 | 45 | −84.7 |
| | 0.769 | 1.64 | 4.68 | 7.96 | 12.64 | 0.35 | 80 | 97 | 1.35 | 1.4472 | 45 | −69.6 |
| | 0.603 | 1.83 | 5.22 | 8.87 | 14.09 | 0.35 | 100 | 121 | 1.35 | 1.4465 | 45 | −58.7 |
| | 0.489 | 2.00 | 5.70 | 9.69 | 15.39 | 0.35 | 120 | 146 | 1.35 | 1.4459 | 45 | −51.3 |
| | 1.150 | 1.74 | 3.87 | 6.58 | 10.45 | 0.45 | 60 | 69 | 1.35 | 1.4482 | 45 | −83.3 |
| | 0.870 | 2.02 | 4.48 | 7.62 | 12.10 | 0.45 | 80 | 91 | 1.35 | 1.4473 | 45 | −69.7 |
| | 0.683 | 2.25 | 5.00 | 8.50 | 13.50 | 0.45 | 100 | 114 | 1.35 | 1.4465 | 45 | −58.4 |
| | 0.560 | 2.46 | 5.47 | 9.30 | 14.77 | 0.45 | 120 | 136 | 1.35 | 1.4460 | 45 | −51.7 |
| | 1.320 | 2.04 | 3.71 | 6.31 | 10.02 | 0.55 | 60 | 66 | 1.35 | 1.4481 | 45 | −79.6 |
| | 0.988 | 2.36 | 4.29 | 7.29 | 11.58 | 0.55 | 80 | 88 | 1.35 | 1.4470 | 45 | −64.4 |
| | 0.796 | 2.65 | 4.81 | 8.18 | 12.99 | 0.55 | 100 | 108 | 1.35 | 1.4465 | 45 | −57.3 |
| | 0.648 | 2.89 | 5.26 | 8.94 | 14.20 | 0.55 | 120 | 130 | 1.35 | 1.4460 | 45 | −49.3 |
| | 2.100 | 2.58 | 3.44 | 5.85 | 9.29 | 0.75 | 60 | 64 | 1.35 | 1.4476 | 45 | −70.2 |
| | 1.578 | 2.99 | 3.98 | 6.77 | 10.75 | 0.75 | 80 | 83 | 1.35 | 1.4467 | 45 | −56.1 |

TABLE 2-continued

| | $\Delta_{out}$ | $r_1$ | $r_2$ | $r_3$ | $r_4$ | $r_1/r_2$ | $A_{eff}$ (LP$_{01}$) | $A_{eff}$ (LP$_{11}$) | $\lambda_{cc}$ (LP$_{21}$) | $n_{eff}$ (LP$_{11}$) | $\Lambda$ | 100-km XT |
|---|---|---|---|---|---|---|---|---|---|---|---|---|
| Unit | % | μm | μm | μm | μm | — | μm² | μm² | μm | — | μm | dB |
| TA-SI | 1.256 | 3.35 | 4.46 | 7.58 | 12.04 | 0.75 | 100 | 103 | 1.35 | 1.4462 | 45 | −47.4 |
| | 1.046 | 3.68 | 4.90 | 8.33 | 13.23 | 0.75 | 120 | 123 | 1.35 | 1.4458 | 45 | −43.1 |
| | 0.753 | 0 | 4.71 | 8.01 | 12.72 | 0 | 60 | 96 | 1.35 | 1.4475 | 45 | −74.3 |
| | 0.548 | 0 | 5.40 | 9.18 | 14.58 | 0 | 80 | 128 | 1.35 | 1.4464 | 45 | −59.0 |
| | 0.420 | 0 | 5.98 | 10.17 | 16.15 | 0 | 100 | 161 | 1.35 | 1.4457 | 45 | −49.3 |
| | 0.331 | 0 | 6.47 | 11.00 | 17.47 | 0 | 120 | 194 | 1.35 | 1.4452 | 45 | −42.5 |

Figure 8:
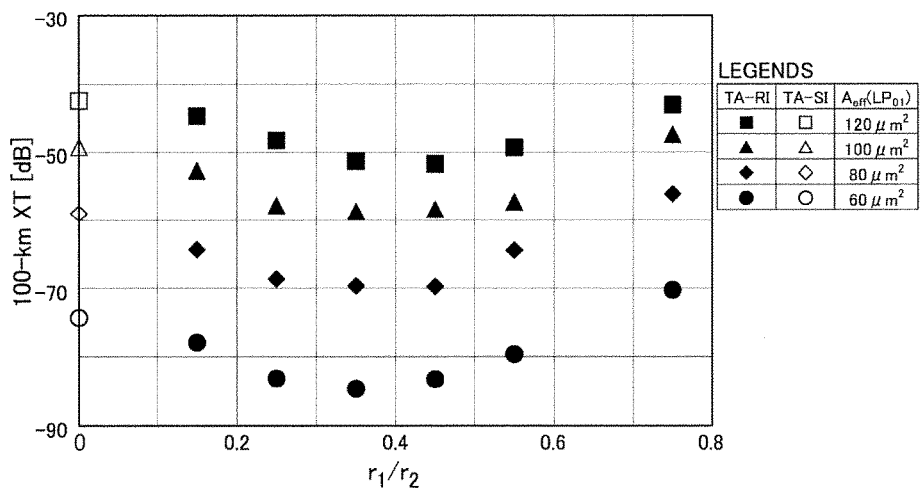
FIG. 8 is a diagram of the evaluation results of Example 2 according to one or more embodiments and Comparative Example 2.

The evaluation results of Example 2 according to one or more embodiments and Comparative Example 2 are shown in FIG. 8. In FIG. 8, the horizontal axis is defined as $r_1/r_2$, and the vertical axis is defined as 100-km XT.

As apparent from Table 2, the difference between the effective area $A_{eff}$ (LP$_{01}$) of the LP$_{01}$ mode light beam and the effective area $A_{eff}$ (LP$_{11}$) of the LP$_{11}$ mode light beam is smaller in Example 2 than in Comparative Example 2. As apparent from FIG. 8, in the case in which the effective area $A_{eff}$ (LP$_{01}$) of the LP$_{01}$ mode light beam is the same, the crosstalk between the LP$_{11}$ mode light beams propagating through the cores adjacent to each other is generally smaller in Example 2 than in Comparative Example 2. Specifically, in the range of $0 < r_1/r_2 \leq 0.6$, the crosstalk is smaller in Example 2 than in Comparative Example 2, and in the range of $0.3 < r_1/r_2 \leq 0.5$, the crosstalk is much smaller in Example 2.

Simulation was performed using the multicore fiber 1, according to one or more embodiments, as a model (RI). The parameters are shown in Table 3 below. In Table 3, $\Delta_{out}$, $r_1$, $r_2$, $A_{eff}$ (LP$_{01}$), $\lambda_{ct}$ (LP$_{21}$), and $\Lambda$ are similar to those in Table 1, $A_{eff}$ (LP$_{21}$) is the effective area of the LP$_{21}$ mode light beam at a wavelength of 1,550 nm, $n_{eff}$(LP$_{21}$) is the effective refractive index of the LP$_{21}$ mode light beam, and 100-km XT is the magnitude of crosstalk per 100 km between the LP$_{21}$ mode light beams propagating through the cores adjacent to each other.

Except that the core is a step index core, simulation of Comparative Example 3 was performed on a model (SI) similar to Example 3. The parameters are shown in Table 3 below. Note that, since the multicore fiber of Comparative Example 3 has a step index core, $r_1=0$. The core is considered to be formed only of the elements corresponding to the outer core 12 of Example 3. Therefore, in Comparative Example 3, $\Delta_{out}$ means the relative refractive index difference of the core to the cladding.

TABLE 3

| | $\Delta_{out}$ | $r_1$ | $r_2$ | $r_1/r_2$ | $A_{eff}$ (LP$_{01}$) | $A_{eff}$ (LP$_{21}$) | $\lambda_{ct}$ (LP$_{21}$) | $n_{eff}$ (LP$_{21}$) | $\Lambda$ | 100-km XT |
|---|---|---|---|---|---|---|---|---|---|---|
| Unit | % | μm | μm | — | μm² | μm² | μm | — | μm | dB |
| RI | 1.221 | 0.71 | 4.73 | 0.15 | 60 | 99 | 1.8 | 1.4470 | 45 | −43.0 |
| | 0.920 | 0.82 | 5.46 | 0.15 | 80 | 131 | 1.8 | 1.4464 | 45 | −26.5 |
| | 0.743 | 0.92 | 6.10 | 0.15 | 100 | 164 | 1.8 | 1.4459 | 45 | −15.3 |
| | 0.620 | 1.00 | 6.68 | 0.15 | 120 | 198 | 1.8 | 1.4456 | 45 | −6.2 |
| | 1.361 | 1.12 | 4.47 | 0.25 | 60 | 89 | 1.8 | 1.4473 | 45 | −49.0 |
| | 1.025 | 1.29 | 5.16 | 0.25 | 80 | 118 | 1.8 | 1.4465 | 45 | −31.0 |
| | 0.824 | 1.44 | 5.77 | 0.25 | 100 | 147 | 1.8 | 1.4461 | 45 | −19.5 |
| | 0.699 | 1.58 | 6.32 | 0.25 | 120 | 176 | 1.8 | 1.4458 | 45 | −11.2 |
| | 1.495 | 1.50 | 4.28 | 0.35 | 60 | 81 | 1.8 | 1.4476 | 45 | −54.7 |
| | 1.140 | 1.73 | 4.94 | 0.35 | 80 | 108 | 1.8 | 1.4467 | 45 | −35.5 |
| | 0.903 | 1.93 | 5.52 | 0.35 | 100 | 135 | 1.8 | 1.4462 | 45 | −22.7 |
| | 0.758 | 2.12 | 6.05 | 0.35 | 120 | 161 | 1.8 | 1.4459 | 45 | −14.6 |
| | 1.630 | 1.86 | 4.14 | 0.45 | 60 | 77 | 1.8 | 1.4477 | 45 | −57.2 |
| | 1.236 | 2.15 | 4.78 | 0.45 | 80 | 101 | 1.8 | 1.4469 | 45 | −39.2 |
| | 0.990 | 2.40 | 5.34 | 0.45 | 100 | 126 | 1.8 | 1.4463 | 45 | −25.6 |
| | 0.828 | 2.63 | 5.85 | 0.45 | 120 | 151 | 1.8 | 1.4460 | 45 | −16.6 |
| | 1.854 | 2.22 | 4.03 | 0.55 | 60 | 73 | 1.8 | 1.4479 | 45 | −60.4 |
| | 1.367 | 2.56 | 4.65 | 0.55 | 80 | 96 | 1.8 | 1.4470 | 45 | −40.6 |
| | 1.109 | 2.86 | 5.20 | 0.55 | 100 | 120 | 1.8 | 1.4464 | 45 | −27.9 |
| | 0.925 | 3.13 | 5.69 | 0.55 | 120 | 143 | 1.8 | 1.4461 | 45 | −17.9 |
| | 2.696 | 2.89 | 3.85 | 0.75 | 60 | 70 | 1.8 | 1.4480 | 45 | −59.5 |
| | 2.041 | 3.33 | 4.44 | 0.75 | 80 | 92 | 1.8 | 1.4470 | 45 | −40.1 |
| | 1.645 | 3.72 | 4.96 | 0.75 | 100 | 114 | 1.8 | 1.4465 | 45 | −27.3 |
| | 1.380 | 4.08 | 5.44 | 0.75 | 120 | 135 | 1.8 | 1.4462 | 45 | −18.4 |
| SI | 1.071 | 0 | 5.05 | 0 | 60 | 113 | 1.8 | 1.4466 | 45 | −34.3 |
| | 0.809 | 0 | 5.82 | 0 | 80 | 150 | 1.8 | 1.4461 | 45 | −19.1 |
| | 0.658 | 0 | 6.52 | 0 | 100 | 187 | 1.8 | 1.4457 | 45 | −9.3 |
| | 0.544 | 0 | 7.13 | 0 | 120 | 224 | 1.8 | 1.4455 | 45 | −2.4 |

Figure 9:
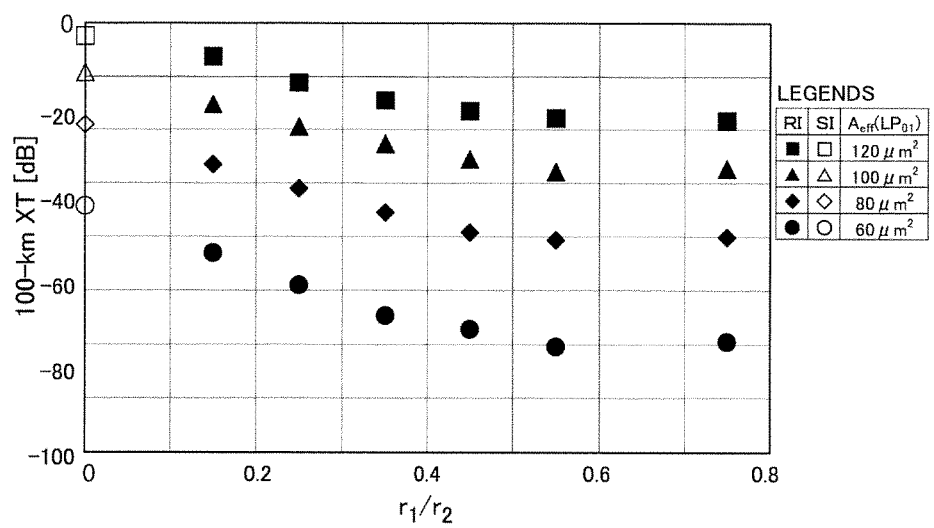
FIG. 9 is a diagram of the evaluation results of Example 3 according to one or more embodiments and Comparative Example 3.

The evaluation results of Example 3 according to one or more embodiments and Comparative Example 3 are shown in FIG. 9. In FIG. 9, the horizontal axis is defined as $r_1/r_2$, and the vertical axis is defined as 100-km XT.

As apparent from Table 3, the difference between the effective area $A_{\mathit{eff}}(LP_{01})$ of the $LP_{01}$ mode light beam and the effective area $A_{\mathit{eff}}(LP_{21})$ of the $LP_{21}$ mode light beam is smaller in Example 3 than in Comparative Example 3. As apparent from FIG. 9, in the case in which the effective area $A_{\mathit{eff}}(LP_{01})$ of the $LP_{01}$ mode light beam is the same, the crosstalk between the $LP_{21}$ mode light beams propagating through the cores adjacent to each other is smaller in Example 3 than in Comparative Example 3. Note that, in the step index core, since the cutoff wavelength of the $LP_{02}$ mode light beam that is in the third higher mode is almost equal to the cutoff wavelength of the $LP_{21}$ mode light beam, four LP mode light beams (the $LP_{01}$ mode, the $LP_{11}$ mode, the $LP_{21}$ mode, and the $LP_{02}$ mode light beams) propagate at a wavelength of 1,550 nm. On the other hand, in the ring index core as in Example 3, when the ratio $r_1/r_2$ is increased, the cutoff wavelength difference between the $LP_{02}$ mode light beam and the $LP_{21}$ mode light beam is increased. Therefore, under the conditions shown in Table 3, in the case in which $r_1/r_2=0.15$ at a wavelength of 1,550 nm, four LP mode light beams propagate through the core. When $r_1/r_2$ exceeds 0.15, only three LP mode light beams (the $LP_{01}$ mode, the $LP_{11}$ mode, and the $LP_{21}$ mode light beams) propagate through the core.

The multicore fiber according to one or more embodiments of the present invention reduces transmission loss as well as reduces the crosstalk between higher mode light beams. The multicore fiber can be used in industries handling optical fiber communication systems with a large transmission capacity.

Although the disclosure has been described with respect to only a limited number of embodiments, those skilled in the art, having benefit of this disclosure, will appreciate that various other embodiments may be devised without departing from the scope of the invention. Accordingly, the scope of the invention should be limited only by the attached claims.

REFERENCE SIGNS LIST 1, 2 . . . multicore fiber
10 . . . core
11 . . . inner core
12 . . . outer core
13 . . . low refractive index part
15 . . . cladding
16 . . . inner protective layer
17 . . . outer protective layer

The invention claimed is:

1. A multicore fiber comprising:
a plurality of cores comprising a first core; and
a cladding surrounding the plurality of cores, wherein the first core comprises:
   an inner core; and
   an outer core surrounding the inner core with no gap and having a refractive index higher than a refractive index of the inner core and a refractive index of the cladding,
the first core is not doped with any rare earth element, and
at least two LP mode light beams at a predetermined wavelength propagate through the first core at an attenuation of 0.3 dB/km or less.

2. The multicore fiber according to claim 1, wherein a ratio $r_1/r_2$ is 0.6 or less where $r_1$ is defined as a radius of the inner core, and $r_2$ is defined as a radius of the outer core.

3. The multicore fiber according to claim 2, wherein the ratio $r_1/r_2$ is 0.3 or more and 0.5 or less.

4. The multicore fiber according to claim 1, wherein the first core is surrounded by a low refractive index that is lower than the refractive index of the cladding.

5. The multicore fiber according to claim 1, wherein a relative refractive index difference of the outer core to the cladding is 3% or less.

6. The multicore fiber according to claim 1, wherein two LP mode light beams at a predetermined wavelength propagate through the first core.

7. The multicore fiber according to claim 1, wherein three LP mode light beams at a predetermined wavelength propagate through the first core.

* * * * *